(12) United States Patent
Suzuki et al.

(10) Patent No.: US 12,463,552 B2
(45) Date of Patent: Nov. 4, 2025

(54) POWER CONVERSION APPARATUS

(71) Applicant: Mitsubishi Electric Corporation, Tokyo (JP)

(72) Inventors: Kenta Suzuki, Tokyo (JP); Toru Kitamura, Tokyo (JP); Hitoshi Sadakuni, Tokyo (JP); Manabu Yoshimura, Tokyo (JP); Ryoko Sasahara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 169 days.

(21) Appl. No.: 18/559,841

(22) PCT Filed: Jun. 9, 2021

(86) PCT No.: PCT/JP2021/021921
§ 371 (c)(1),
(2) Date: Nov. 9, 2023

(87) PCT Pub. No.: WO2022/259422
PCT Pub. Date: Dec. 15, 2022

(65) Prior Publication Data
US 2024/0250616 A1   Jul. 25, 2024

(51) Int. Cl.
*H02M 7/483* (2007.01)
*H02M 7/00* (2006.01)

(52) U.S. Cl.
CPC ......... *H02M 7/4835* (2021.05); *H02M 7/003* (2013.01)

(58) Field of Classification Search
CPC ..... H02M 7/483; H02M 7/4835; H02M 7/003
See application file for complete search history.

(56) References Cited

U.S. PATENT DOCUMENTS

| | | | |
|---|---|---|---|
| 11,909,014 B2 * | 2/2024 | Kwon | H01M 50/503 |
| 12,142,924 B2 * | 11/2024 | Sul | H02M 7/4835 |
| 2019/0280614 A1 | 9/2019 | Koyanagi et al. | |
| 2020/0177097 A1 | 6/2020 | Takahashi et al. | |
| 2021/0273576 A1 | 9/2021 | Nakabayashi et al. | |
| 2022/0109210 A1 * | 4/2022 | Carignan | H01M 50/507 |
| 2024/0405555 A1 * | 12/2024 | Pieschel | H02J 3/1857 |

FOREIGN PATENT DOCUMENTS

| | | |
|---|---|---|
| CN | 107800272 A | 3/2018 |
| CN | 110957930 A | 4/2020 |
| JP | 2007012986 A | 1/2007 |
| JP | 2011207603 A | 10/2011 |

(Continued)

OTHER PUBLICATIONS

Extended European Search Report dated Jul. 1, 2024, issued in the corresponding European Patent Application No. 21945098.8, 14 pages.

(Continued)

*Primary Examiner* — Adolf D Berhane
(74) *Attorney, Agent, or Firm* — BUCHANAN, INGERSOLL & ROONEY PC

(57) ABSTRACT

A power conversion apparatus comprises a plurality of submodules and an insulating structure. The plurality of submodules are aligned in at least one of a first direction and a second direction orthogonal to the first direction. Adjacent two of the submodules are insulated from each other by the insulating structure.

9 Claims, 29 Drawing Sheets

(56) References Cited

FOREIGN PATENT DOCUMENTS

| WO | 2013/000512 A1 | 1/2013 |
| WO | 2017168518 A1 | 10/2017 |
| WO | 2019030859 A1 | 2/2019 |
| WO | 2020017033 A1 | 1/2020 |

OTHER PUBLICATIONS

International Search Report (PCT/ISA/210) and Written Opinion with translation mailed on Aug. 10, 2021, by the Japanese Patent Office as the International Searching Authority for International Application No. PCT/JP2021/021921. (9 pages).

* cited by examiner

POWER CONVERSION APPARATUS

TECHNICAL FIELD

The present disclosure relates to a power conversion apparatus.

BACKGROUND ART

WO 2017/168518 (PTL 1) describes a power conversion apparatus. The power conversion apparatus described in PTL 1 comprises a plurality of poles, a plurality of insulating substrates, a plurality of insulators, and a plurality of insulating shields.

The plurality of poles are aligned on a mounting surface. The plurality of insulating substrates are vertically spaced. The insulating substrate closest to the mounting surface is supported by the plurality of poles. The insulator is disposed between two adjacent insulating substrates. A plurality of cell converters are disposed on the insulating substrate. The insulating shield is disposed around the insulating substrate.

CITATION LIST

Patent Literature

[PTL 1] WO 2017/168518

SUMMARY OF INVENTION

Technical Problem

In the power conversion apparatus described in PTL 1, no insulating member is disposed between two cell converters adjacently disposed on the insulating substrate. Therefore, in order to ensure insulation between the adjacent cell converters, it is necessary to have a large distance between the two adjacent cell converters. Therefore, the power conversion apparatus described in PTL 1 has cell converters supported on an insulating substrate increased in size, and hence an insulating shield increased in size, and hence has an increased footprint and an increased height. The power conversion apparatus described in PTL 1 also has an increased weight.

The present disclosure has been made in view of the above problem of the conventional art. More specifically, the present disclosure provides a power conversion apparatus that can be reduced in size and weight.

Solution to Problem

A power conversion apparatus of the present disclosure comprises a plurality of submodules and an insulating structure. The plurality of submodules are aligned in at least one of a first direction and a second direction orthogonal to the first direction. Adjacent two of the plurality of submodules are insulated from each other by the insulating structure.

Advantageous Effects of Invention

The presently disclosed power conversion apparatus can thus have a reduced size and weight.

DESCRIPTION OF EMBODIMENTS

Embodiments of the present disclosure will now be described with reference to the drawings. In the following figures, identical or equivalent components are identically denoted and will not be described repeatedly.

First Embodiment

A power conversion apparatus according to a first embodiment (hereinafter referred to as a "power conversion apparatus 100") will now be described.

Configuration of Power Conversion Apparatus 100

Figure 1:
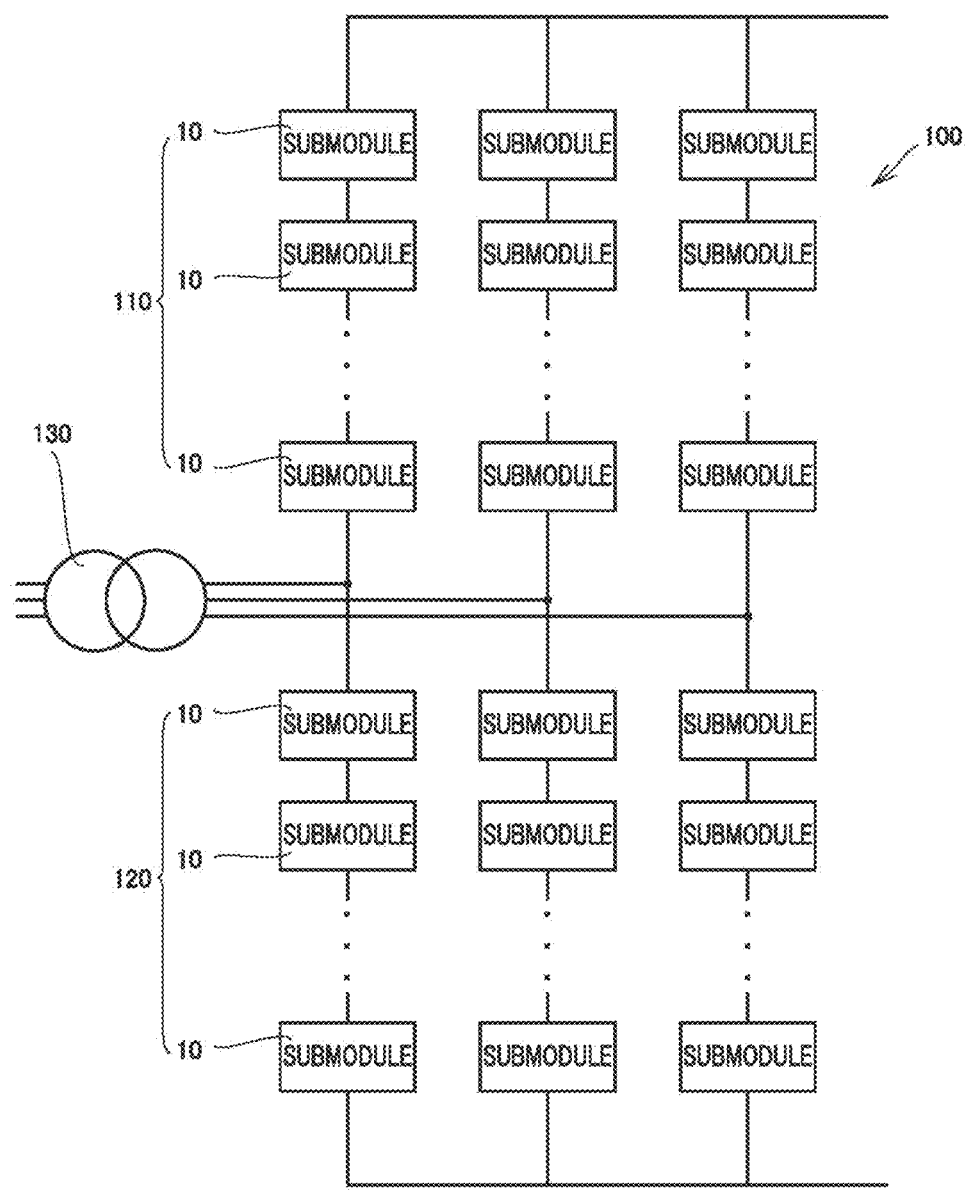
FIG. 1 is a schematic circuit diagram of a power conversion apparatus 100.

Power conversion apparatus 100 is, for example, a MMC (Multilevel Modular Convertor) HVDC (high voltage DC)

converter. Note, however, that power conversion apparatus 100 is not limited thereto. FIG. 1 is a schematic circuit diagram of power conversion apparatus 100. As shown in FIG. 1, power conversion apparatus 100 has a plurality of pairs each of an upper arm 110 and a lower arm 120. Upper arm 110 and lower arm 120 are connected in series. The plurality of pairs each of upper arm 110 and lower arm 120 are connected in parallel. A transformer 130 is connected between upper arms 110 and lower arms 120. Upper arms 110 and lower arms 120 have a plurality of submodules 10 connected in series.

Figure 2:
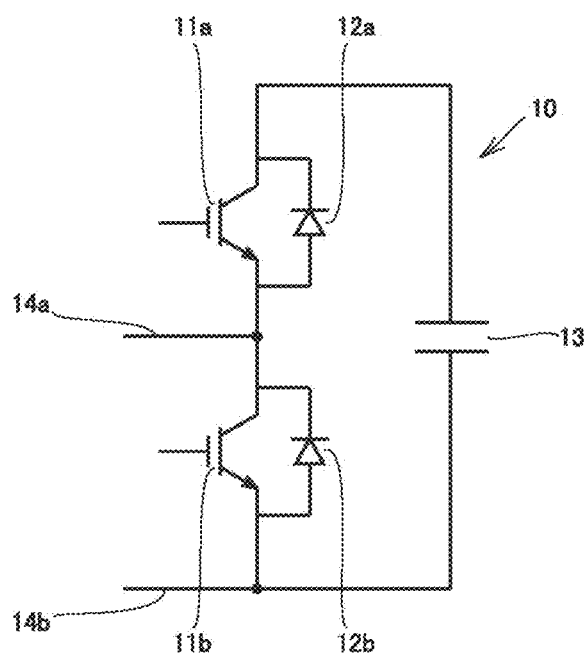
FIG. 2 is a schematic circuit diagram of a submodule 10.

FIG. 2 is a schematic circuit diagram of submodule 10. As shown in FIG. 2, submodule 10 includes, for example, switching elements 11a and 11b, diodes 12a and 12b, a capacitor 13, and connection lines 14a and 14b.

Switching elements 11a and 11b are, for example, IGBT (Insulated Gate Bipolar Transistor). Switching elements 11a and 11b are connected in series.

Diodes 12a and 12b are connected in parallel so as to be reverse-biased to switching elements 11a and 11b, respectively. Capacitor 13 is connected to series-connected switching elements 11a and 11b in parallel.

Connection line 14a is connected to the emitter of switching element 11a and the collector of switching element 11b. Connection line 14b is connected to the emitter of switching element 11b. Connection line 14a of one submodule 10 is connected to connection line 14b of another, adjacent submodule 10. Thus, submodule 10 constitutes a half-bridge type converter cell. Submodule 10 may constitute a full-bridge type converter cell.

Figure 3:
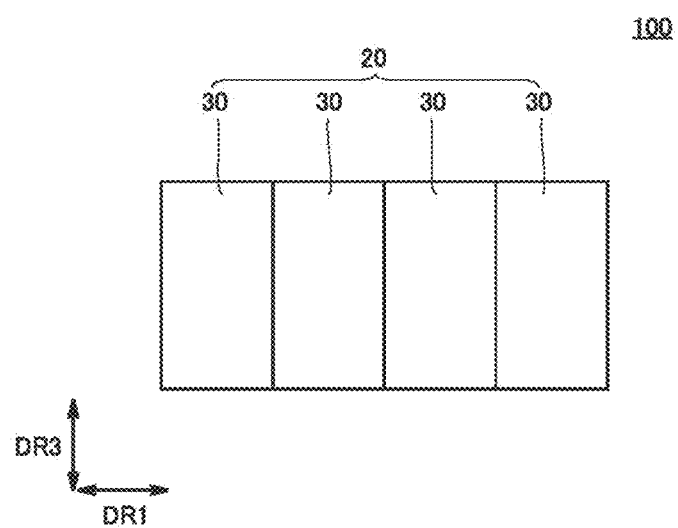
FIG. 3 is a plan view of power conversion apparatus 100.
Figure 4:
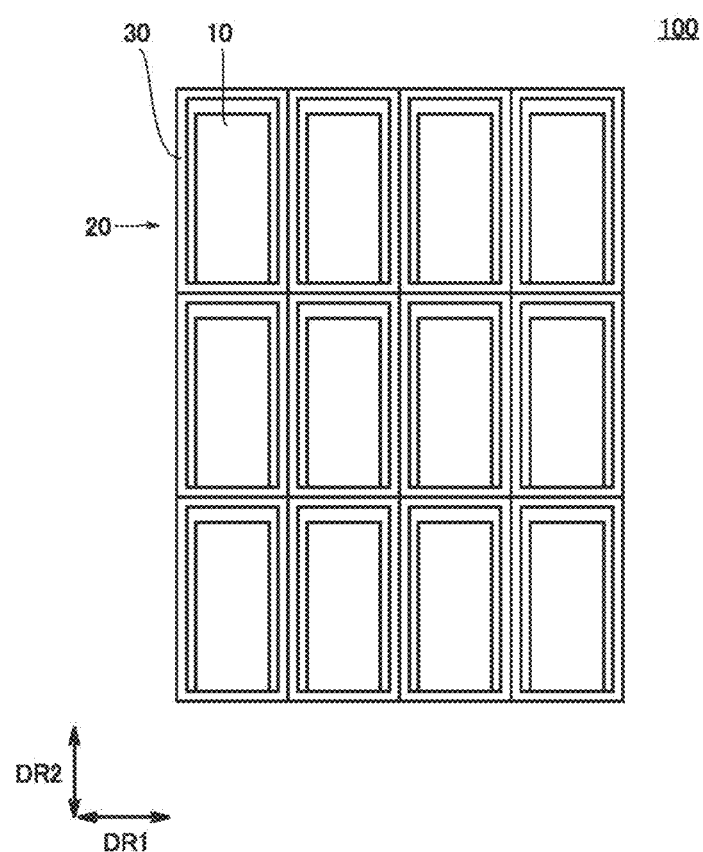
FIG. 4 is a front view of power conversion apparatus 100.
Figure 5:
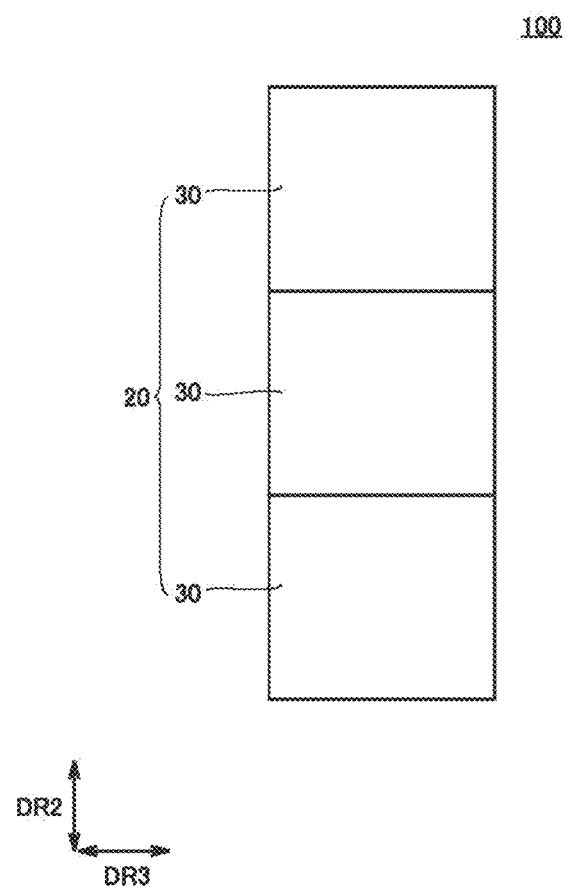
FIG. 5 is a side view of power conversion apparatus 100.
Figure 6:
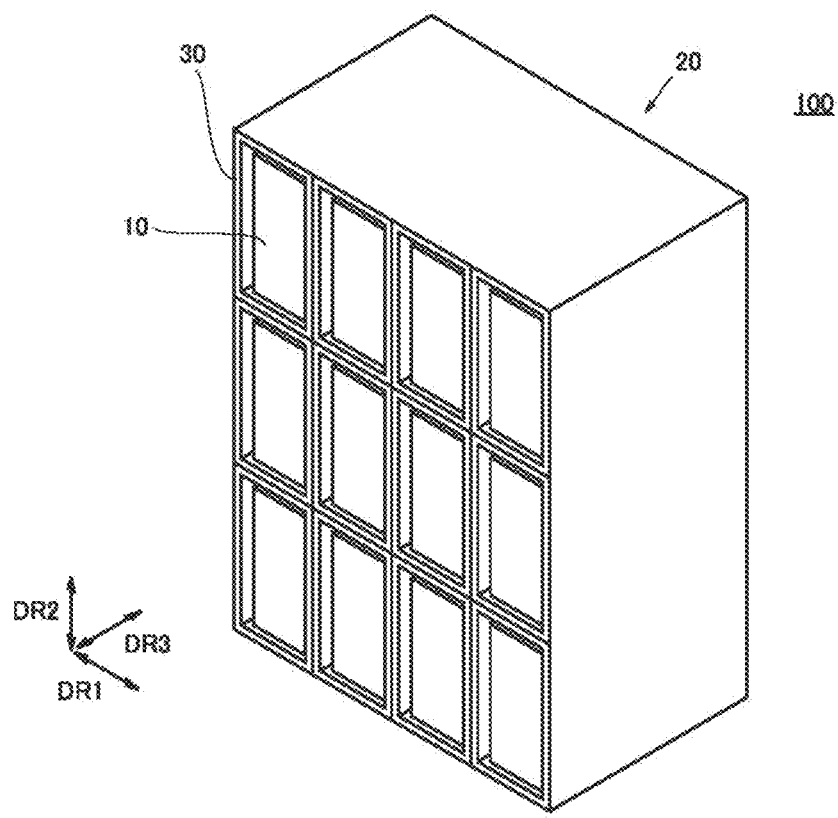
FIG. 6 is a perspective view of power conversion apparatus 100.

FIG. 3 is a plan view of power conversion apparatus 100. FIG. 4 is a front view of power conversion apparatus 100. FIG. 5 is a side view of power conversion apparatus 100. FIG. 6 is a perspective view of power conversion apparatus 100. As shown in FIGS. 3, 4, 5, and 6, the plurality of submodules 10 are aligned in a first direction DR1 and a second direction DR2. Note, however, that the plurality of submodules 10 may be aligned in one of first direction DR1 and second direction DR2.

Second direction DR2 is orthogonal to first direction DR1. First direction DR1 corresponds to a horizontal direction. Second direction DR2 corresponds to a vertical direction.

Power conversion apparatus 100 comprises an insulating structure 20. Insulating structure 20 is disposed on an installation surface. Two submodules 10 adjacent to each other in first direction DR1 are insulated from each other by insulating structure 20. Two submodules 10 adjacent to each other in second direction DR2 are insulated from each other by insulating structure 20.

Insulating structure 20 is, for example, a plurality of insulating housings 30. Insulating housing 30 is made of an insulating material. Insulating housing 30 is preferably formed of a lightweight and highly rigid material. Insulating housing 30 is formed for example of a resin material such as epoxy or FRP (fiber reinforced plastic). Insulating housing 30 may be formed of insulated metal material, concrete, or porcelain. The material for the insulating housing is insulated for example by applying an insulating material, insulating coating, or the like.

Figure 7:
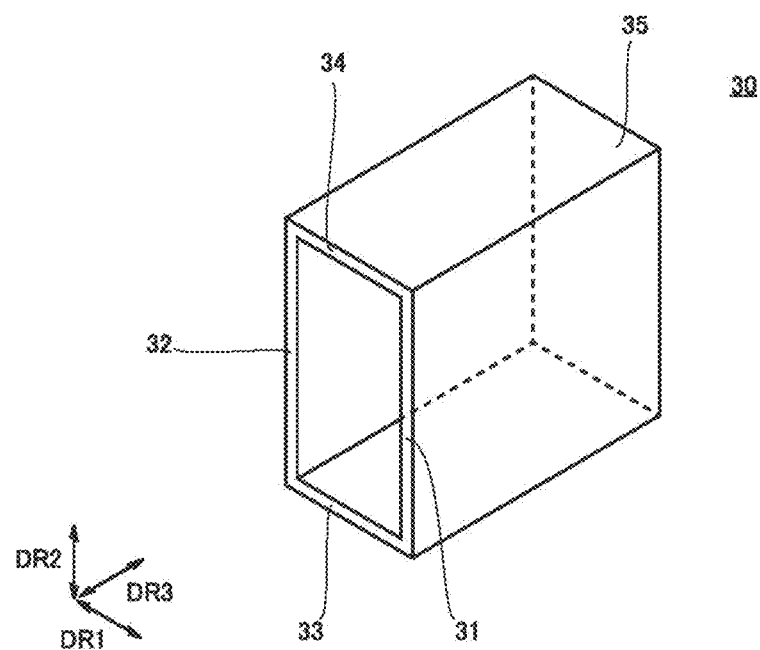
FIG. 7 is a perspective view of an insulating housing 30.

FIG. 7 is a perspective view of insulating housing 30. As shown in FIG. 7, insulating housing 30 includes a first side wall portion 31, a second side wall portion 32, a bottom wall portion 33, a top wall portion 34, and a back wall portion 35. Insulating housing 30 may not have back wall portion 35.

First side wall portion 31 and second side wall portion 32 are spaced in first direction DR1 and face each other. Bottom wall portion 33 and top wall portion 34 are spaced in second direction DR2 and face each other. Bottom wall portion 33 is contiguous to the lower ends of first side wall portion 31 and second side wall portion 32. Top wall portion 34 is contiguous to the upper ends of first side wall portion 31 and second side wall portion 32.

A direction orthogonal to first direction DR1 and second direction DR2 is referred to as a third direction DR3. Third direction DR3 corresponds to a horizontal direction. Back wall portion 35 is contiguous to one ends of first side wall portion 31, second side wall portion 32, bottom wall portion 33, and top wall portion 34 in third direction DR3. Thereby, one end side of insulating housing 30 in third direction DR3 is closed. The other end side of insulating housing 30 in third direction DR3 is open.

First side wall portion 31, second side wall portion 32, bottom wall portion 33, and top wall portion 34 define an internal space of insulating housing 30. Submodule 10 is disposed in the internal space of insulating housing 30. Submodule 10 is disposed in the internal space of insulating housing 30, for example, through an opening located on the other end side of insulating housing 30 in third direction DR3.

The plurality of insulating housings 30 are aligned in first direction DR1 and second direction DR2. When the plurality of submodules 10 are aligned in one of first direction DR1 and second direction DR2, the plurality of insulating housings 30 are also aligned in one of first direction DR1 and second direction DR2.

One of two adjacent insulating housings 30 is fixed to the other of the two adjacent insulating housings 30. More specifically, one of two insulating housings 30 adjacent to each other in first direction DR1 has first side wall portion 31 fixed to second side wall portion 32 of the other of the two insulating housings 30 adjacent to each other in first direction DR1. Further, one of two insulating housings 30 adjacent to each other in second direction DR2 has bottom wall portion 33 fixed to top wall portion 34 of the other of the two insulating housings 30 adjacent to each other in second direction DR2. This fixing is done, for example, by bonding. This fixing may be done using a fixing member formed of an insulating material.

Submodule 10 disposed in the internal space of one of two adjacent insulating housings 30 is connected, for example by a cable (not shown), to submodule 10 disposed in the internal space of the other of the two adjacent insulating housings 30. The cable is inserted, for example, through an opening provided on the other end side of insulating housing 30 in third direction DR3.

Effect of Power Conversion Apparatus 100

An effect of power conversion apparatus 100 will be described below.

Power conversion apparatus 100 has two adjacent submodules 10 insulated from each other by insulating structure 20 (more specifically, by first side wall portion 31 and second side wall portion 32 or bottom wall portion 33 and top wall portion 34). Therefore, power conversion apparatus 100 can be reduced in size by reducing a distance between two adjacent submodules 10.

Furthermore, power conversion apparatus 100 has two adjacent submodules 10 insulated from each other by insulating structure 20. Furthermore, power conversion apparatus 100 also has a bottom portion of submodule 10 closest to the ground side covered with insulating structure 20. Therefore, power conversion apparatus 100 does not need an insulating shield and can thus be reduced in weight. Power conversion apparatus 100 can thus be reduced in size and weight.

Power conversion apparatus 100 allows the configuration of insulating structure 20 to be changed by changing the number of insulating housings 30 aligned in first direction DR1 and second direction DR2, and thus has a large degree of freedom in changing a layout. Therefore, power conversion apparatus 100 can be flexibly changed in layout depending on factors such as a required number of submodules 10, a footprint, etc.

Power conversion apparatus 100 allows submodule 10 to be disposed in the internal space of insulating housing 30 through an opening of insulating housing 30, and thus facilitates installing submodule 10. Power conversion apparatus 100 allows submodule 10 to be accessed through the opening of insulating housing 30 and thus facilitates maintenance. Power conversion apparatus 100 allows heat of submodule 10 to be easily released through the opening of insulating housing 30 and can thus enhance performance of cooling submodule 10.

Modified Example 1

Figure 8:
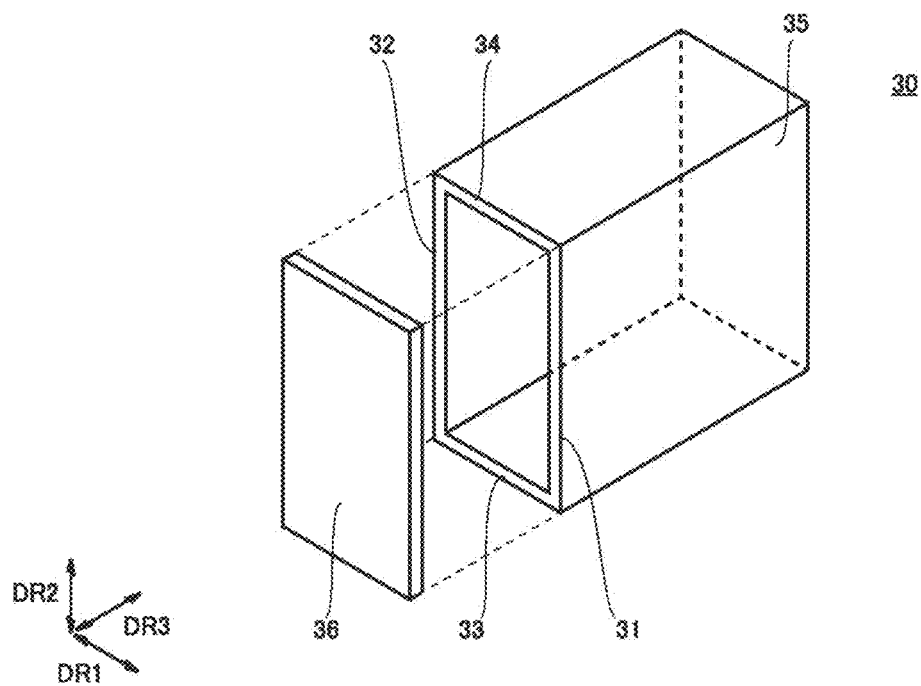
FIG. 8 is an exploded perspective view of insulating housing 30 according to a modified example.

FIG. 8 is an exploded perspective view of insulating housing 30 according to a modified example. As shown in FIG. 8, insulating housing 30 may further include a front wall portion 36. Front wall portion 36 closes the other end side of insulating housing 30 in third direction DR3. Front wall portion 36 is detachable from the other ends of first side wall portion 31, second side wall portion 32, bottom wall portion 33, and top wall portion 34 in third direction DR3. Front wall portion 36 is attached after submodule 10 is disposed in the internal space of insulating housing 30. Insulating housing 30 having front wall portion 36 can enhance insulation for submodule 10.

Modified Example 2

Figure 9:
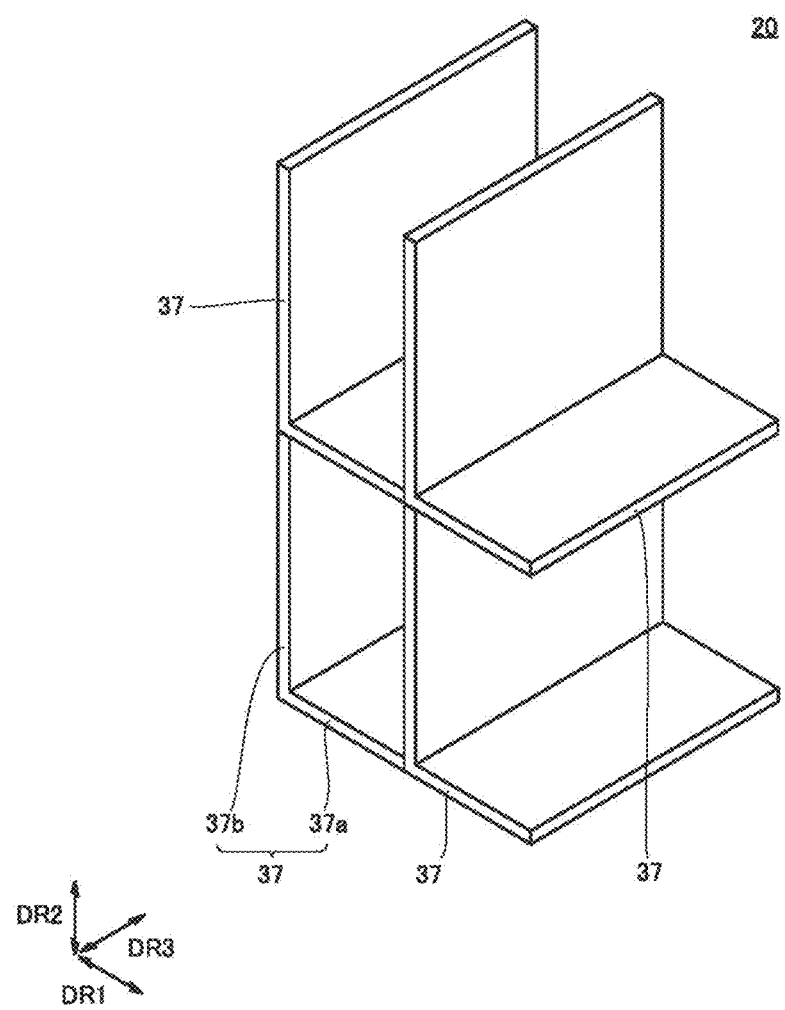
FIG. 9 is a perspective view of an insulating structure 20 according to a modified example.

FIG. 9 is a perspective view of insulating structure 20 according to a modified example. As shown in FIG. 9, insulating structure 20 may not be composed of a plurality of insulating housings 30. For example, it may be formed by assembling a plurality of insulating members 37. FIG. 9 only shows some of insulating members 37 constituting insulating structure 20. Insulating member 37 has a first portion 37a and a second portion 37b. First portion 37a extends in first direction DR1. Second portion 37b extends in second direction DR2 from an end of first portion 37a in first direction DR1. That is, insulating member 37 is L-shaped. Assembling such insulating members 37 can also provide a similar insulating structure 20.

Second Embodiment

A power conversion apparatus according to a second embodiment (hereinafter referred to as a "power conversion apparatus 100A") will be described. Hereinafter, how power conversion apparatus 100A is different from power conversion apparatus 100 will mainly be described.

Configuration of Power Conversion Apparatus 100A

A configuration of power conversion apparatus 100A will be described below.

Figure 10:
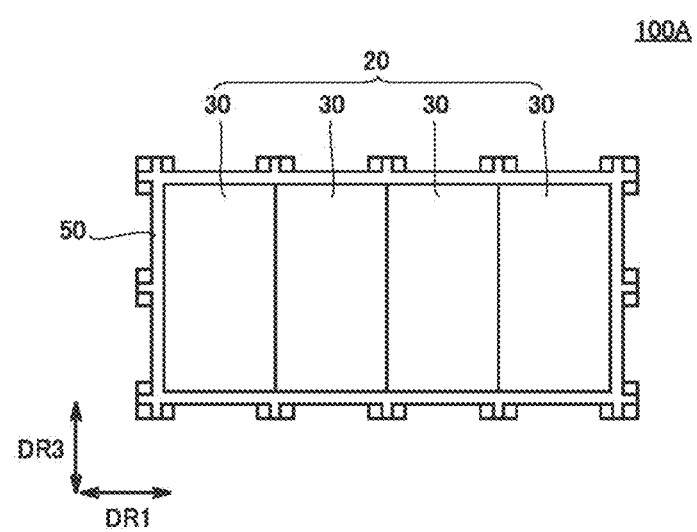
FIG. 10 is a plan view of a power conversion apparatus 100A.
Figure 11:
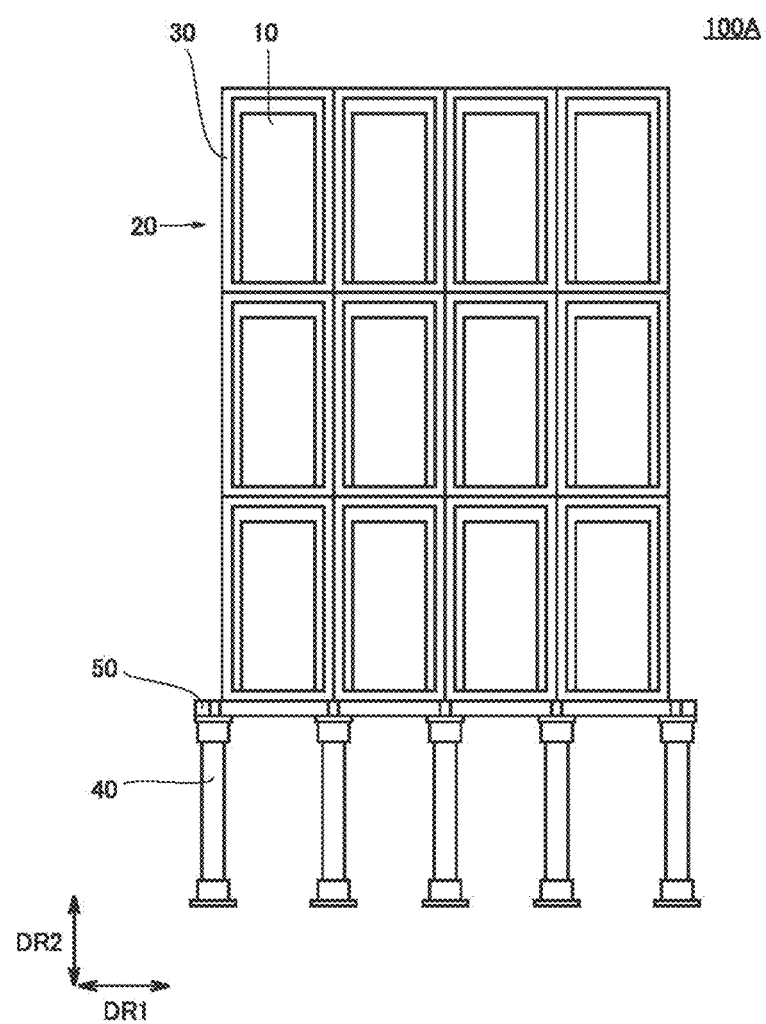
FIG. 11 is a front view of power conversion apparatus 100A.
Figure 12:
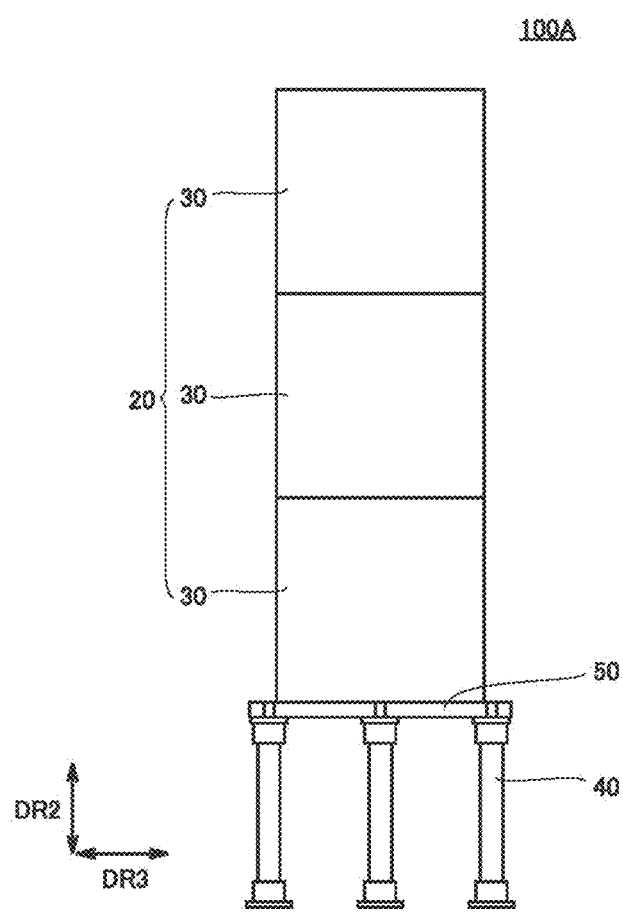
FIG. 12 is a side view of power conversion apparatus 100A.

FIG. 10 is a plan view of power conversion apparatus 100A. FIG. 11 is a front view of power conversion apparatus 100A. FIG. 12 is a side view of power conversion apparatus 100A. As shown in FIGS. 10, 11, and 12, power conversion apparatus 100A comprises a plurality of submodules 10 and insulating structure 20. In power conversion apparatus 100A, insulating structure 20 is a plurality of insulating housings 30. In these respects, power conversion apparatus 100A has a configuration common to that of power conversion apparatus 100.

Power conversion apparatus 100A further comprises a plurality of support insulators 40 and a first frame 50. In this respect, the configuration of power conversion apparatus 100A is different than power conversion apparatus 100.

The plurality of support insulators 40 are aligned in a plane orthogonal to second direction DR2. That is, the plurality of support insulators 40 are aligned on an installation surface. Support insulator 40 is made of an insulating material. The insulating material is, for example, FRP. Support insulator 40 may have a surface with pleats formed of a polymer material. Support insulator 40 may be formed of porcelain (that is, it may be a porcelain insulator).

First frame 50 is disposed on the plurality of support insulators 40. That is, first frame 50 is supported by the plurality of support insulators 40. Insulating structure 20 (the plurality of insulating housings 30) is disposed on first frame 50. First frame 50 is formed of a material having high rigidity. First frame 50 is formed for example of a metal material.

Effect of Power Conversion Apparatus 100A

An effect of power conversion apparatus 100A will be described below.

Power conversion apparatus 100A that has first frame 50 supported by the plurality of support insulators 40 and has insulating structure 20 (the plurality of insulating housings 30) disposed on first frame 50, ensures a ground insulation distance between submodule 10 and the installation surface.

Third Embodiment

A power conversion apparatus according to a third embodiment (hereinafter referred to as a "power conversion apparatus 100B") will be described. Hereinafter, how power conversion apparatus 100B is different from power conversion apparatus 100A will mainly be described.

Figure 13:
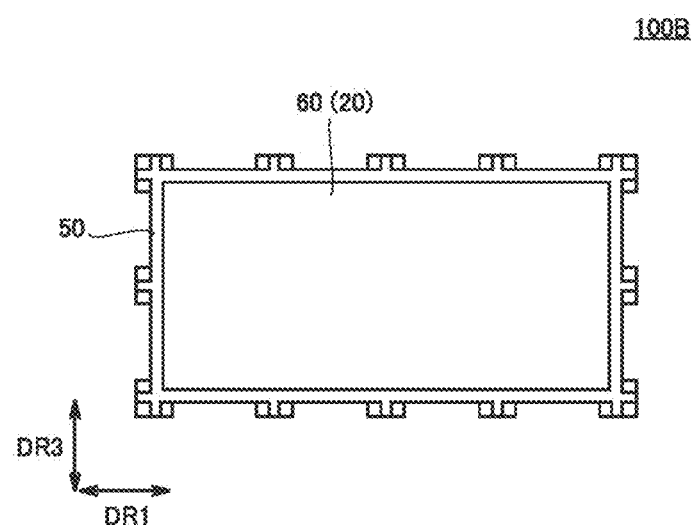
FIG. 13 is a plan view of a power conversion apparatus 100B.
Figure 14:
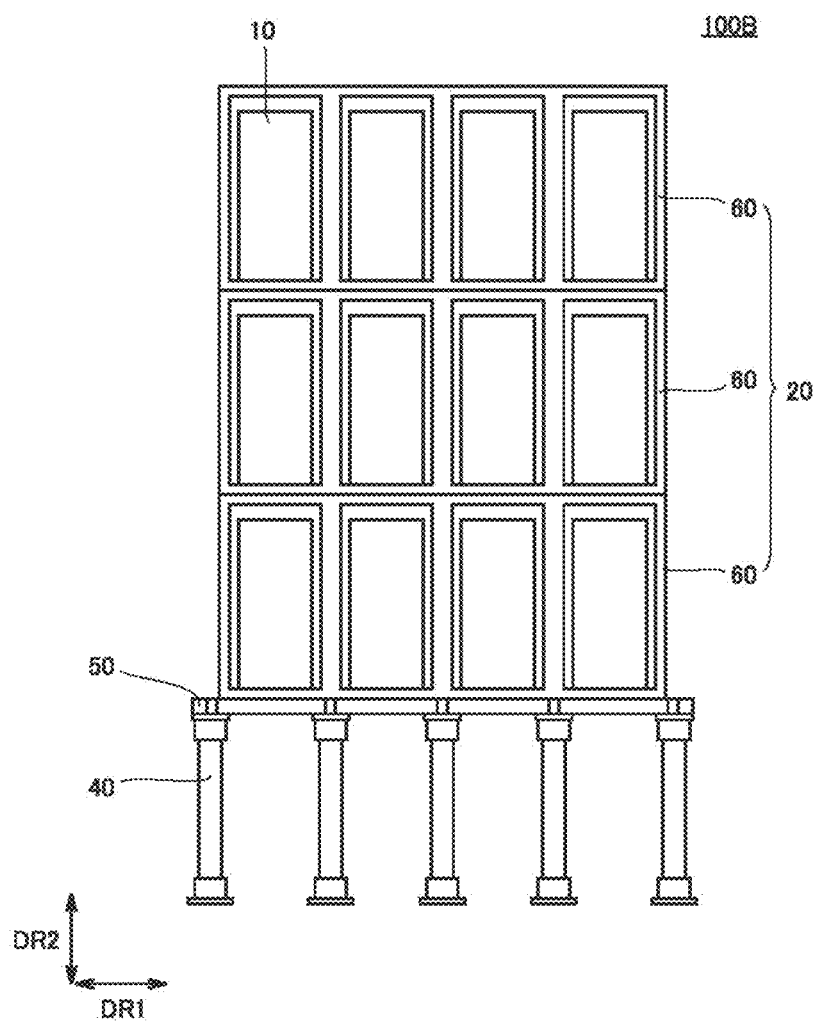
FIG. 14 is a front view of power conversion apparatus 100B.
Figure 15:
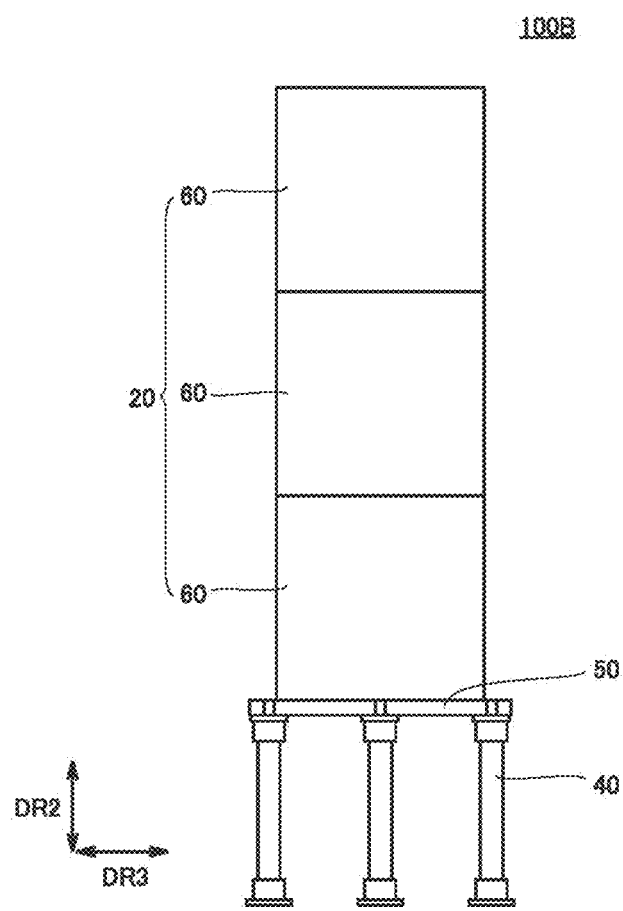
FIG. 15 is a side view of power conversion apparatus 100B.

FIG. 13 is a plan view of power conversion apparatus 100B. FIG. 14 is a front view of power conversion apparatus 100B. FIG. 15 is a side view of power conversion apparatus 100B. As shown in FIGS. 13, 14, and 15, power conversion apparatus 100B comprises a plurality of submodules 10, insulating structure 20, a plurality of support insulators 40, and first frame 50. In this respect, power conversion apparatus 100B has a configuration common to that of power conversion apparatus 100A.

In power conversion apparatus 100B, insulating structure 20 is a plurality of insulating racks 60. In this respect, power conversion apparatus 100B has a configuration different than power conversion apparatus 100A. Only a single insulating racks 60 may be used, rather than the plurality of insulating racks 60. The plurality of insulating racks 60 are aligned in second direction DR2.

Figure 16:
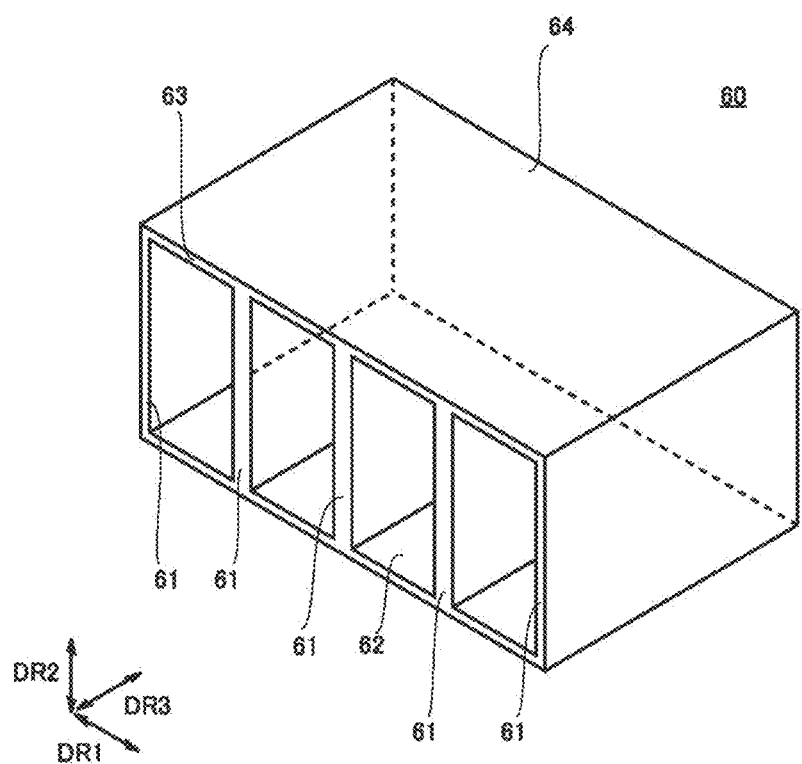
FIG. 16 is a perspective view of an insulating rack 60.

Insulating rack 60 is made of an insulating material. Insulating rack 60 is preferably formed of a lightweight and highly rigid material. Insulating rack 60 is formed for example of a resin material such as epoxy or FRP. FIG. 16 is a perspective view of insulating rack 60. As shown in FIG. 16, insulating rack 60 has a plurality of side wall portions 61, a bottom wall portion 62, a top wall portion 63, and a back wall portion 64. Insulating rack 60 may not have back wall portion 64.

The plurality of side wall portions 61 are aligned in first direction DR1. Two adjacent side wall portions 61 are spaced in first direction DR1 and face each other. Bottom wall portion 62 is contiguous to the lower ends of the plurality of side wall portions 61. Top wall portion 63 is contiguous to the upper ends of the plurality of side wall portions 61. Bottom wall portion 62 and top wall portion 63 are spaced in second direction DR2 and face each other. Back wall portion 64 is contiguous to one ends of the plurality of side wall portions 61, bottom wall portion 62, and top wall portion 63 in third direction DR3. Thereby, one end side of insulating rack 60 in third direction DR3 is closed. The other end side of insulating rack 60 in third direction DR3 is open.

Two adjacent side wall portions 61, bottom wall portion 62, and top wall portion 63 define an internal space of insulating rack 60. Submodule 10 is disposed in the internal space of insulating rack 60. Submodule 10 is disposed in the internal space of insulating rack 60, for example, through an opening located on the other end side of insulating rack 60 in third direction DR3.

One of two adjacent insulating racks 60 is fixed to the other of the two adjacent insulating racks 60. More specifically, one of two insulating racks 60 adjacent to each other in second direction DR2 has bottom wall portion 62 fixed to top wall portion 63 of the other of the two insulating racks 60 adjacent to each other in second direction DR2. This fixing is done, for example, by bonding. This fixing may be done using a fixing member formed of an insulating material.

Effect of Power Conversion Apparatus 100B

An effect of power conversion apparatus 100B will be described below.

The number of insulating racks 60 used to configure insulating structure 20 is smaller than the number of insulating housings 30 used to configure insulating structure 20 when the same number of submodules 10 are disposed. Power conversion apparatus 100B thus facilitates installation of insulating structure 20.

Modified Example

Figure 17:
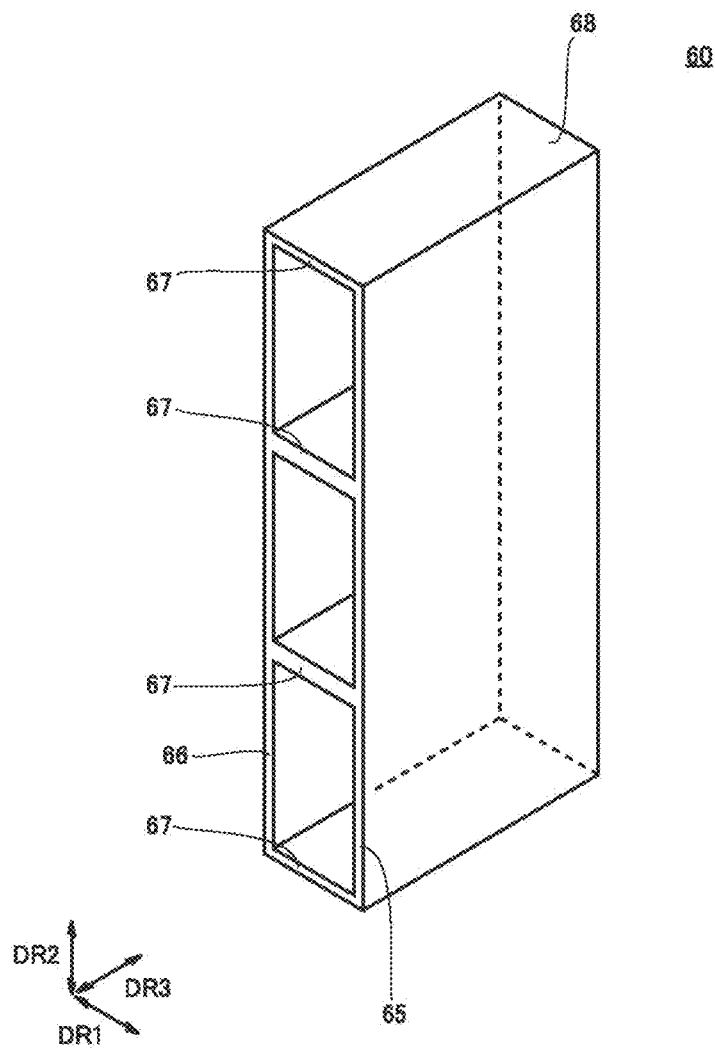
FIG. 17 is a perspective view of insulating rack 60 according to a modified example.

FIG. 17 is a perspective view of insulating rack 60 according to a modified example. As shown in FIG. 17, insulating rack 60 may have a first side wall portion 65, a second side wall portion 66, a plurality of partition wall portions 67, and a back wall portion 68, rather than the plurality of side wall portions 61, bottom wall portion 62, top wall portion 63, and back wall portion 64.

First side wall portion 65 and second side wall portion 66 are spaced in first direction DR1 and face each other. The plurality of partition wall portions 67 are aligned in second direction DR2. Two adjacent partition wall portions 67 are spaced in second direction DR2 and face each other. First side wall portion 65 is contiguous to one ends of the plurality of partition wall portions 67 in first direction DR1, and second side wall portion 66 is contiguous to the other ends of the plurality of partition wall portions 67 in first direction DR1.

Back wall portion 68 is contiguous to one ends of first side wall portion 65, second side wall portion 66, and the plurality of partition wall portions 67 in third direction DR3. Thereby, one end side of insulating rack 60 in third direction DR3 is closed. The other end side of insulating rack 60 in third direction DR3 is open. First side wall portion 65, second side wall portion 66, and adjacent partition wall portion 67 define an internal space of insulating rack 60.

In this case, insulating racks 60 are aligned in first direction DR1. Furthermore, in this case, one of two insulating racks 60 adjacent to each other in first direction DR1 has first side wall portion 65 fixed to second side wall portion 66 of the other of the two insulating racks 60 adjacent to each other in first direction DR1.

Fourth Embodiment

A power conversion apparatus according to a fourth embodiment (hereinafter referred to as a "power conversion apparatus 100C") will be described. Hereinafter, how power conversion apparatus 100C is different from power conversion apparatus 100B will mainly be described.

Configuration of Power Conversion Apparatus 100C

A configuration of power conversion apparatus 100C will be described below.

Figure 18:
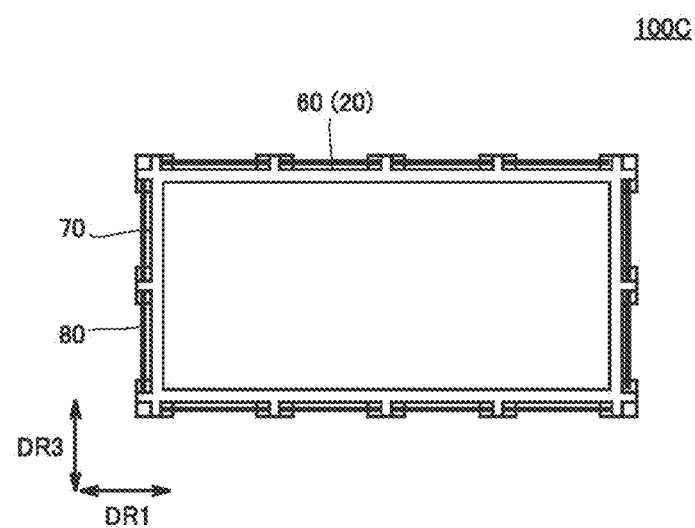
FIG. 18 is a plan view of a power conversion apparatus 100C.
Figure 19:
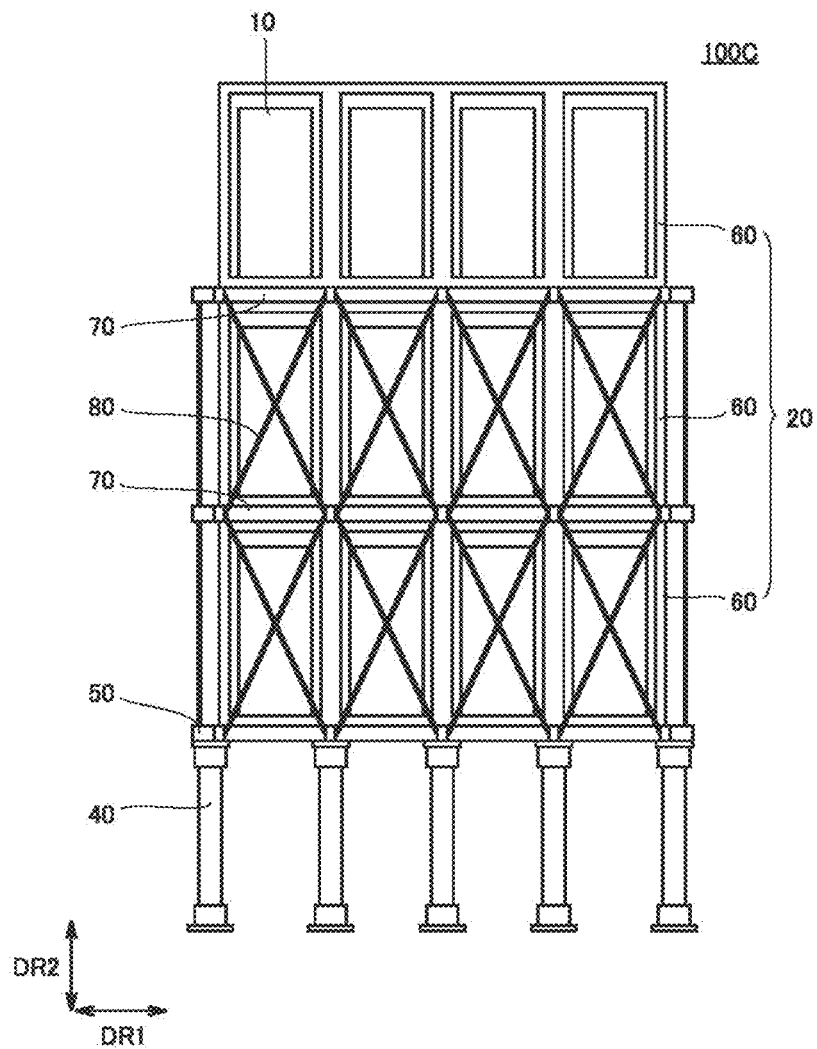
FIG. 19 is a front view of power conversion apparatus 100C.
Figure 20:
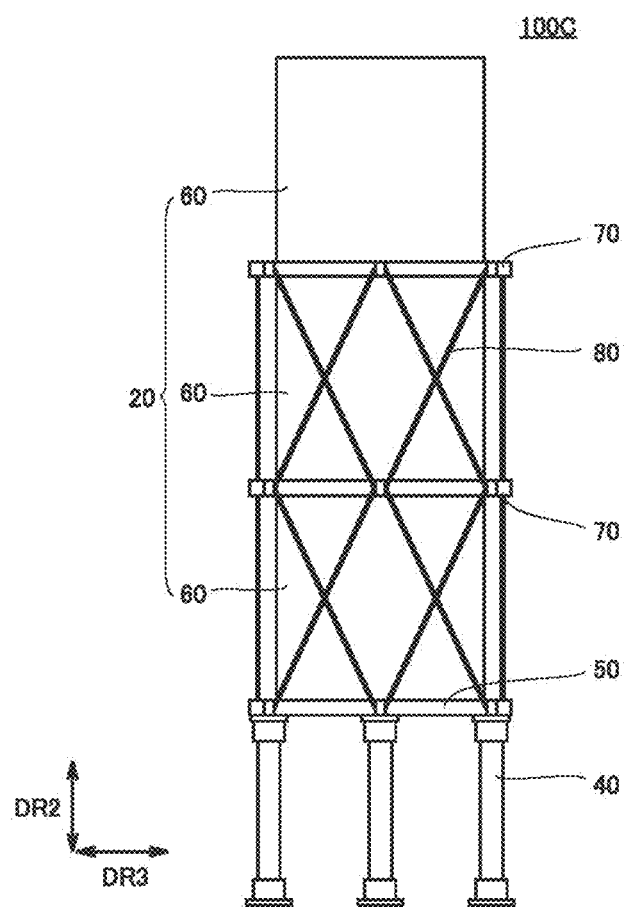
FIG. 20 is a side view of power conversion apparatus 100C.

FIG. 18 is a plan view of power conversion apparatus 100C. FIG. 19 is a front view of power conversion apparatus 100C. FIG. 20 is a side view of power conversion apparatus 100C. As shown in FIGS. 18, 19 and 20, power conversion apparatus 100C comprises a plurality of submodules 10, insulating structure 20, a plurality of support insulators 40, and first frame 50. In power conversion apparatus 100C, insulating structure 20 is a plurality of insulating racks 60. In these respects, power conversion apparatus 100C has a configuration common to that of power conversion apparatus 100B.

Power conversion apparatus 100C further comprises a plurality of second frames 70 and a brace 80. In this respect, power conversion apparatus 100C has a configuration different than power conversion apparatus 100B.

Figure 21:
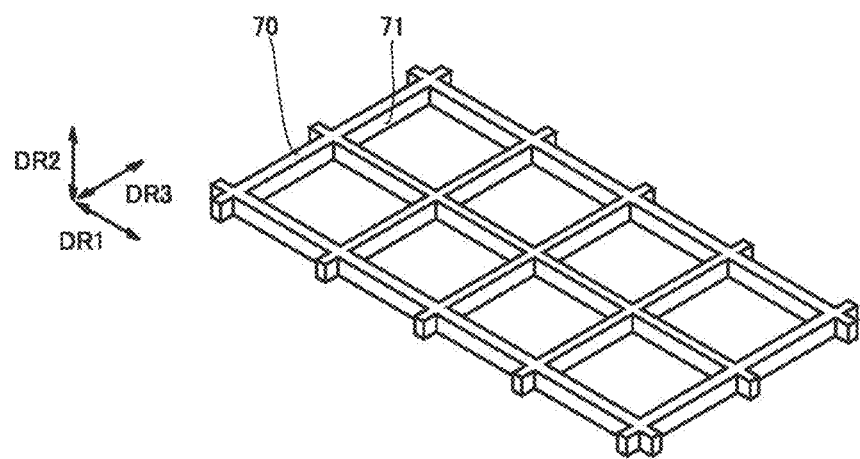
FIG. 21 is a perspective view of a second frame 70.

Second frame 70 is disposed between two insulating racks 60 adjacent to each other in second direction DR2. Second frame 70 is made of a material having high rigidity. Second frame 70 is formed for example of a metal material. FIG. 21 is a perspective view of second frame 70. As shown in FIG. 21, second frame 70 has a plurality of through holes 71. Through hole 71 penetrates second frame 70 in second direction DR2 (or the direction of the thickness of second frame 70). Second frame 70 is thus lightweight.

First frame 50 and second frame 70 closest to first frame 50 are fixed to each other. Two second frames 70 adjacent to each other in second direction DR2 are fixed to each other. First frame 50 and second frame 70 closest to first frame 50 are fixed to each other by brace 80, and so are two second frames 70 adjacent to each other in second direction DR2.

In the example shown in FIGS. 18, 19 and 20, first frame 50 and second frame 70 closest to first frame 50 are fixed to each other on one and the other sides in first direction DR1 and on one and the other sides in third direction DR3, and so are two second frames 70 adjacent to each other in second direction DR2. Note, however, that first frame 50 and second frame 70 closest to first frame 50 may not be fixed to each other on the other side in third direction DR3, and neither may two second frames 70 adjacent to each other in second direction DR2.

Effect of Power Conversion Apparatus 100C

An effect of power conversion apparatus 100C will be described below.

Power conversion apparatus 100C that has first frame 50 and second frame 70 closest to first frame 50 fixed to each other and has two second frames 70 adjacent to each other in second direction DR2 fixed to each other, can be enhanced in resistance to earthquake.

Fifth Embodiment

A power conversion apparatus according to a fifth embodiment (hereinafter referred to as a "power conversion apparatus 100D") will be described. Hereinafter, how power conversion apparatus 100D is different from power conversion apparatus 100B will mainly be described.

Configuration of Power Conversion Apparatus 100D

A configuration of power conversion apparatus 100D will be described below.

Figure 22:
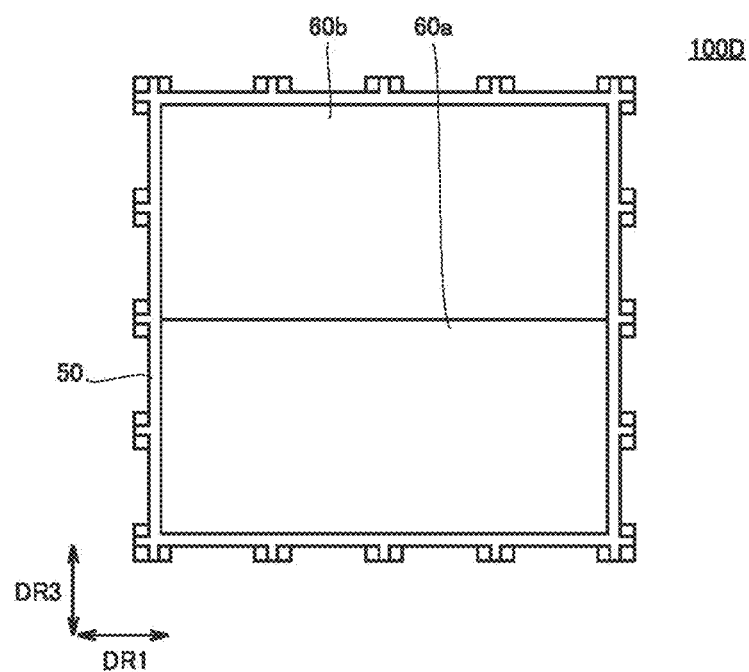
FIG. 22 is a plan view of a power conversion apparatus 100D.
Figure 23:
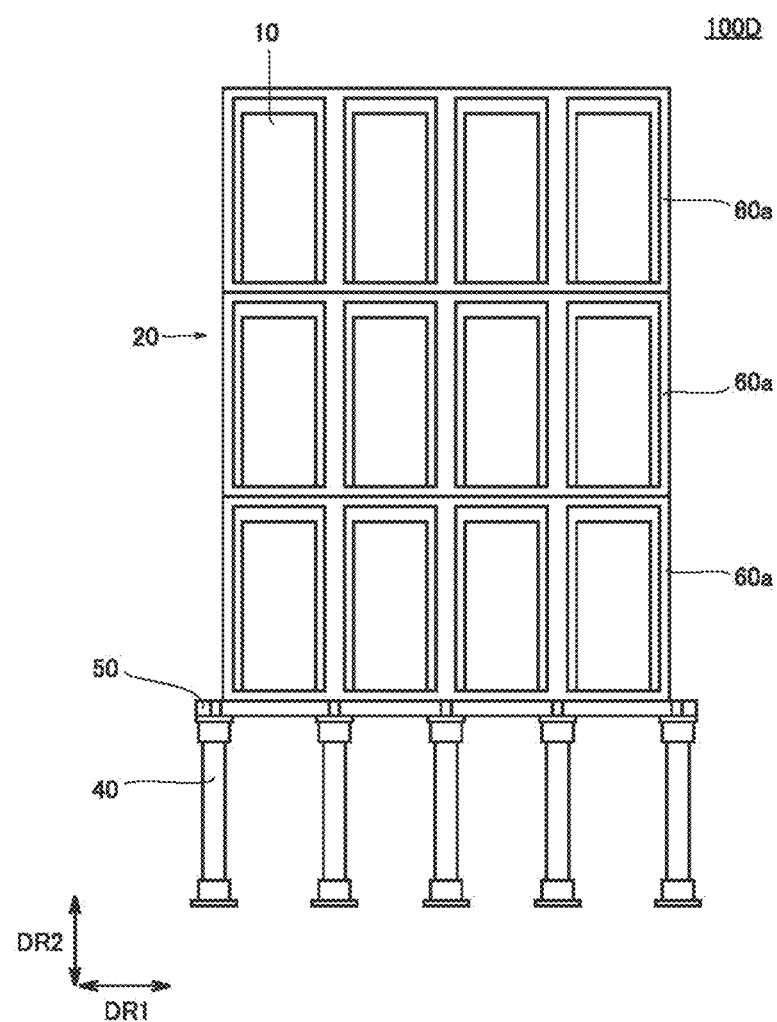
FIG. 23 is a front view of power conversion apparatus 100D.
Figure 24:
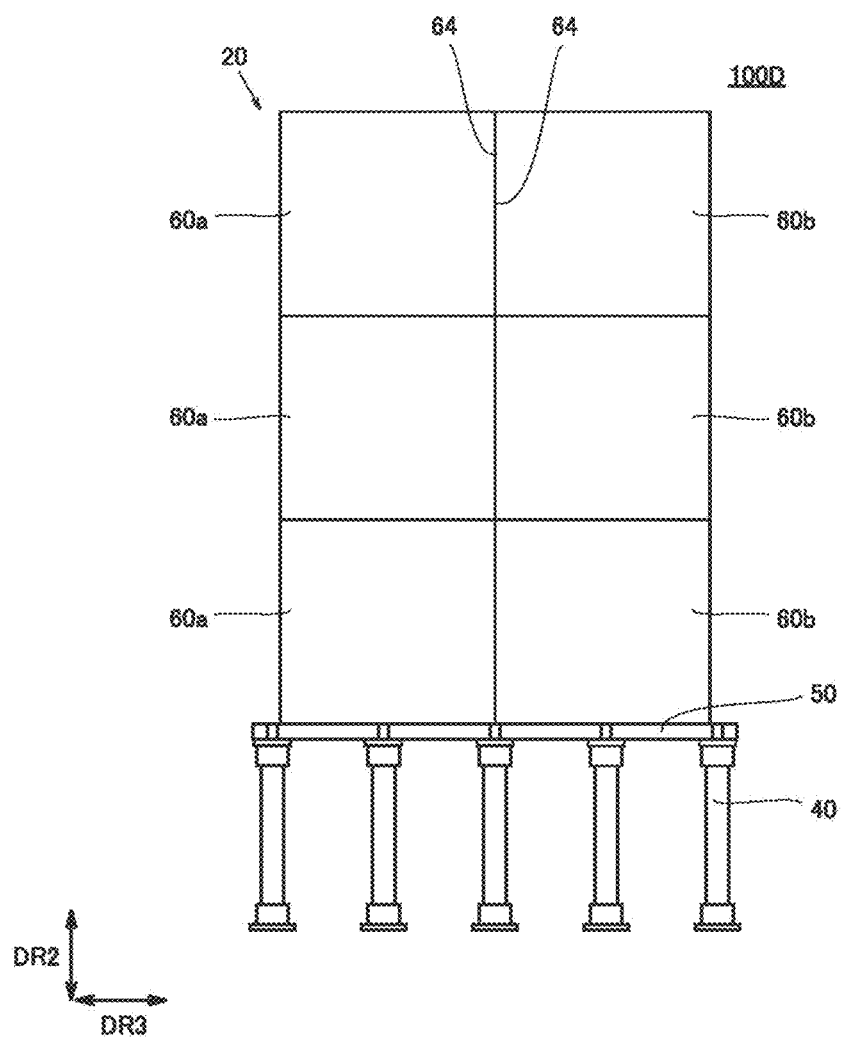
FIG. 24 is a side view of power conversion apparatus 100D.
Figure 25:
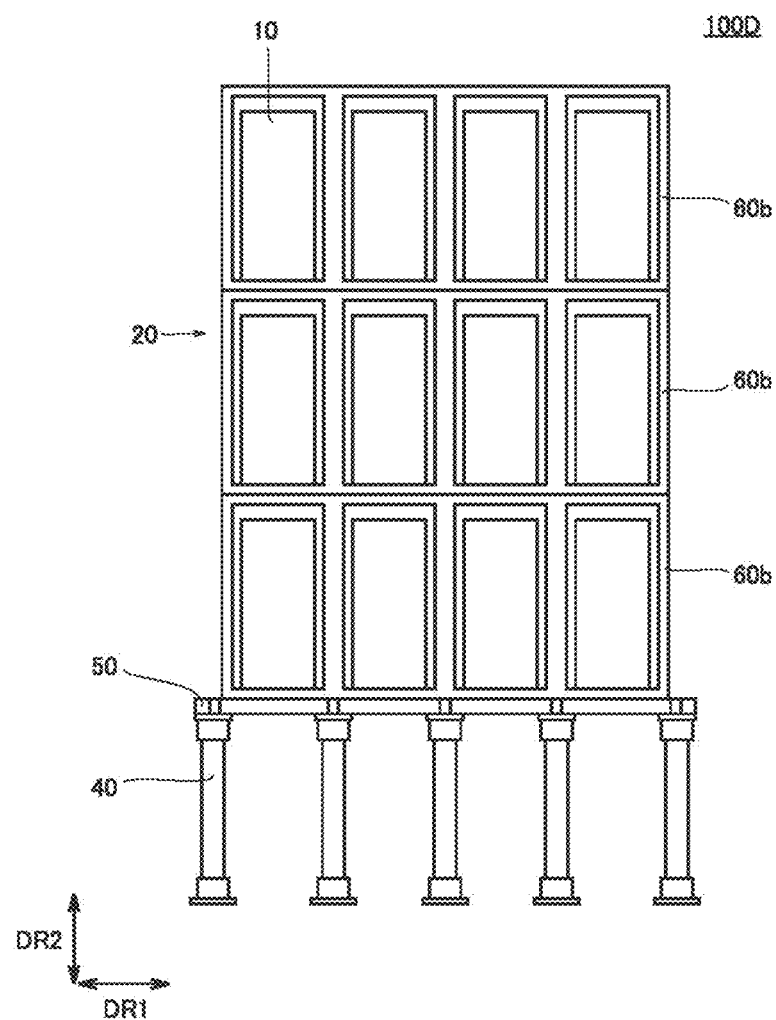
FIG. 25 is a rear view of power conversion apparatus 100D.

FIG. 22 is a plan view of power conversion apparatus 100D. FIG. 23 is a front view of power conversion apparatus 100D. FIG. 24 is a side view of power conversion apparatus 100D. FIG. 25 is a rear view of power conversion apparatus 100D. As shown in FIGS. 22, 23, 24, and 25, power conversion apparatus 100D comprises a plurality of submodules 10, insulating structure 20, a plurality of support insulators 40, and first frame 50. In power conversion apparatus 100D, insulating structure 20 is a plurality of insulating racks 60. In these respect, power conversion apparatus 100D has a configuration common to that of power conversion apparatus 100B.

In power conversion apparatus 100D, the plurality of insulating racks 60 includes a plurality of first insulating racks 60a and a plurality of second insulating racks 60b. In this respect, power conversion apparatus 100D has a configuration different than power conversion apparatus 100B.

The plurality of first insulating racks 60a are aligned in second direction DR2. The plurality of second insulating racks 60b are aligned in second direction DR2. The plurality of first insulating racks 60a and the plurality of second insulating racks 60b are aligned in third direction DR3 back to back. That is, back wall portion 64 of first insulating rack 60a faces back wall portion 64 of second insulating rack 60b in third direction DR3. Back wall portion 64 of first insulating rack 60a is preferably fixed to back wall portion 64 of second insulating rack 60b.

Effect of Power Conversion Apparatus 100D

An effect of power conversion apparatus 100D will be described below.

Power conversion apparatus 100D that has back wall portion 64 of first insulating rack 60a and back wall portion 64 of second insulating rack 60b between two submodules 10 adjacent to each other in third direction DR3, allows a spacing between two submodules 10 adjacent to each other in third direction DR3 to be reduced. Power conversion apparatus 100D allows a reduced footprint even when an increased number of submodules 10 is required.

Sixth Embodiment

A power conversion apparatus according to a sixth embodiment (hereinafter referred to as a "power conversion apparatus 100E") will be described. Hereinafter, how power conversion apparatus 100E is different from power conversion apparatus 100B will mainly be described.

Configuration of Power Conversion Apparatus 100E

An effect of power conversion apparatus 100E will be described below.

Figure 26:
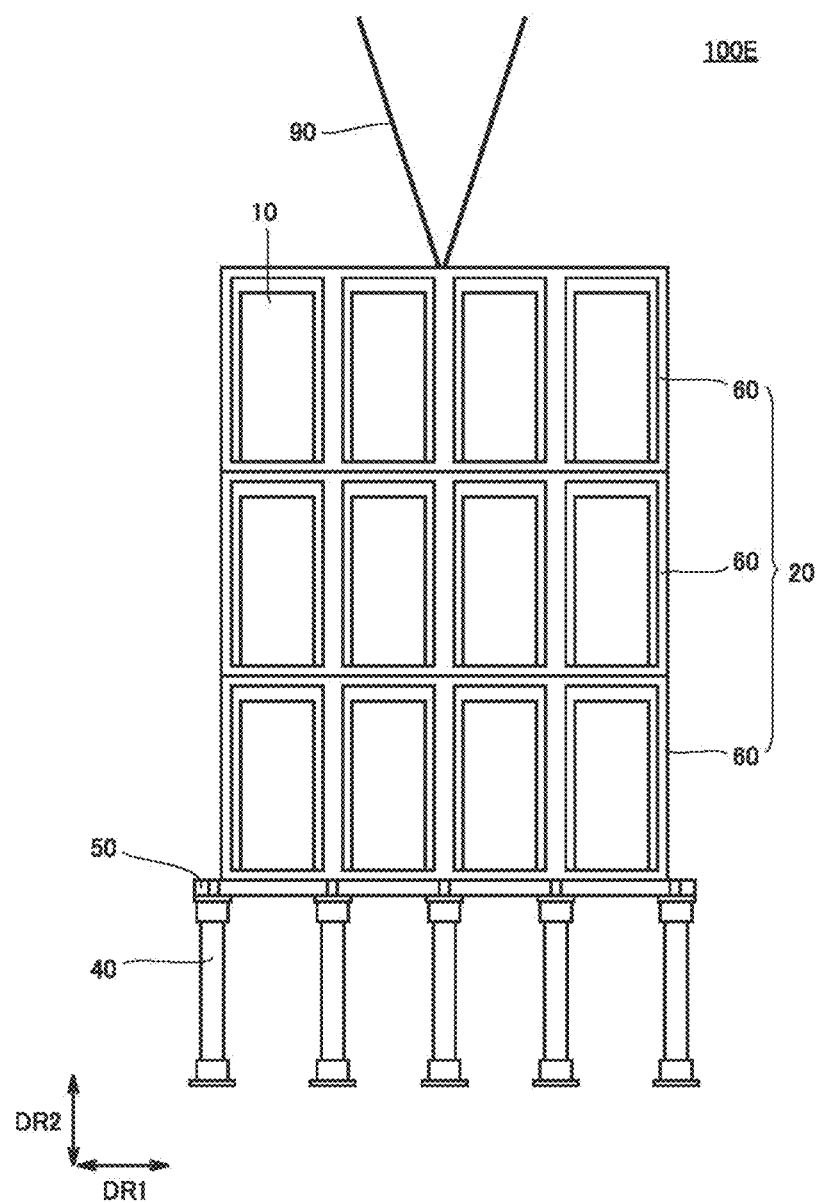
FIG. 26 is a front view of a power conversion apparatus 100E.
Figure 27:
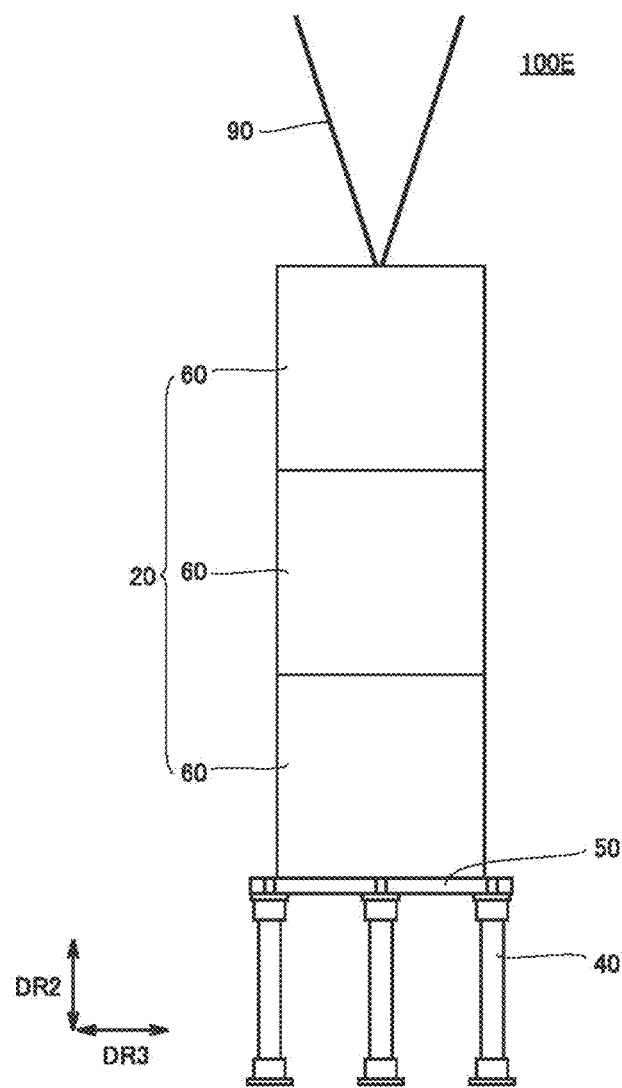
FIG. 27 is a side view of power conversion apparatus 100E.

FIG. 26 is a front view of power conversion apparatus 100E. FIG. 27 is a side view of power conversion apparatus 100E. As shown in FIGS. 26 and 27, power conversion apparatus 100E comprises a plurality of submodules 10, insulating structure 20, a plurality of support insulators 40, and first frame 50. In power conversion apparatus 100E, insulating structure 20 is a plurality of insulating racks 60. In these respect, power conversion apparatus 100E has a configuration common to that of power conversion apparatus 100B.

Power conversion apparatus 100E further comprises a reinforcing member 90. In this respect, power conversion apparatus 100E has a configuration different than power conversion apparatus 100B.

Reinforcing member 90 connects an upper surface of insulating structure 20 (an upper surface of an uppermost insulating rack 60) to a ceiling portion or a wall surface portion of a building in which power conversion apparatus 100E is stored. Reinforcing member 90 is made of an insulating material. The insulating material is, for example, FRP or a resin material. Reinforcing member 90 may be formed of an insulated metal material.

Effect of Power Conversion Apparatus 100E

An effect of power conversion apparatus 100E will be described below.

Power conversion apparatus 100E has the plurality of submodules 10 each insulated by insulating structure 20 (or the plurality of insulating racks 60), and there is no need to consider insulation between power conversion apparatuses. Even when an increased number of submodules 10 is required, power conversion apparatus 100E allows efficient layout and hence a reduced footprint.

Configuration of Power Conversion Apparatus 100F

A configuration of power conversion apparatus 100F will be described below.

Figure 28:
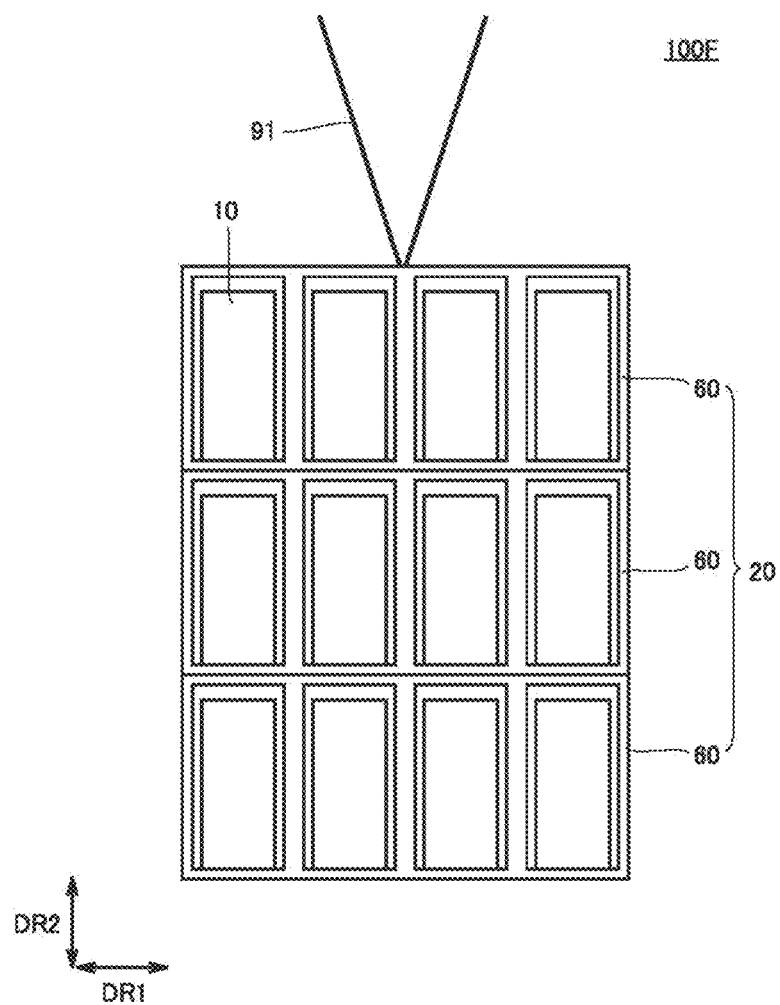
FIG. 28 is a front view of a power conversion apparatus 100F.
Figure 29:
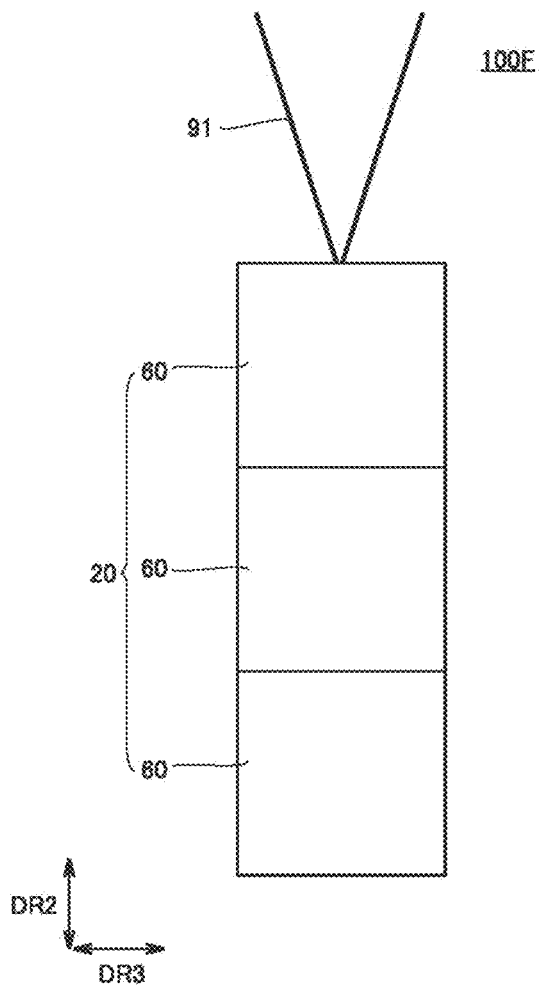
FIG. 29 is a side view of power conversion apparatus 100F.

FIG. 28 is a front view of power conversion apparatus 100F. FIG. 29 is a side view of power conversion apparatus 100F. As shown in FIGS. 28 and 29, power conversion apparatus 100F comprises a plurality of submodules 10, insulating structure 20, a plurality of support insulators 40, and first frame 50. In power conversion apparatus 100F, insulating structure 20 is a plurality of insulating racks 60. In these respect, power conversion apparatus 100F has a configuration common to that of power conversion apparatus 100B.

Power conversion apparatus 100F further comprises a suspension support member 91. Power conversion apparatus 100F does not have the plurality of support insulators 40 and first frame 50. In this respect, power conversion apparatus 100F has a configuration different than power conversion apparatus 100B.

Suspension support member 91 connects an upper surface of insulating structure 20 (an upper surface of an uppermost insulating rack 60) to a ceiling portion or a wall surface portion of a building in which power conversion apparatus 100F is stored. Power conversion apparatus 100F is thus suspended from the ceiling portion or wall surface portion of the building in which power conversion apparatus 100F is stored.

Suspension support member 91 is made of an insulating material. The insulating material is, for example, FRP or a resin material. Suspension support member 91 may be formed of an insulated metal material. The plurality of insulating racks 60 constituting insulating structure 20 are fixed to one another by a wire for example.

Effect of Power Conversion Apparatus 100F

An effect of power conversion apparatus 100F will be described below.

Power conversion apparatus 100F is suspended by suspension support member 91 from a ceiling portion or wall surface portion of a building in which power conversion apparatus 100F is stored, and power conversion apparatus 100F is thus not in contact with the ground. Therefore, power conversion apparatus 100F does not receive seismic motion from the ground when an earthquake occurs, and power conversion apparatus 100F is thus improved in resistance to earthquake.

It should be understood that the embodiments disclosed herein have been described for the purpose of illustration only and in a non-restrictive manner in any respect. The present disclosure has a fundamental scope defined by the terms of the claims, rather than the embodiments described above, and intended to encompass any modifications within the meaning and scope equivalent to the terms of the claims.

REFERENCE SIGNS LIST 10 submodule, 11a, 11b switching element, 12a, 12b diode, 13 capacitor, 14a, 14b connection line, 20 insulating structure, 30 insulating housing, 31 first side wall portion, 32 second side wall portion, 33 bottom wall portion, 34 top wall portion, 35 back wall portion, 36 front wall portion, 37 insulating member, 37a first portion, 37b second portion, 40 support insulator, 50 first frame, 60 insulating rack, 60a first insulating rack, 60b second insulating rack, 61 side wall portion, 62 bottom wall portion, 63 top wall portion, 64 back wall portion, 65 first side wall portion, 66 second side wall portion, 67 partition wall portion, 68 back wall portion, 70 second frame, 71 through hole, 80 brace, 90 reinforcing member, 91 suspension support member, 100, 100A, 100B, 100C, 100D, 100E power conversion apparatus, 110 upper arm, 120 lower arm, 130 transformer, DR1 first direction, DR2 second direction, DR3 third direction.

The invention claimed is:

1. A power conversion apparatus comprising:
a plurality of submodules; and
an insulating structure,
the plurality of submodules being aligned in at least one of a first direction and a second direction orthogonal to the first direction,
adjacent two of the plurality of submodules being insulated from each other by the insulating structure,
the power conversion apparatus further comprising:
a plurality of support insulators extending in the second direction and aligned in a plane orthogonal to the second direction; and
a first frame disposed on the plurality of support insulators,
wherein the insulating structure is disposed on the first frame.

2. The power conversion apparatus according to claim 1, wherein
the insulating structure is a plurality of insulating housings,
the plurality of insulating housings each include: a first side wall portion and a second side wall spaced from and facing each other; a bottom wall portion contiguous to a lower end of the first side wall portion and a lower end of the second side wall portion; and a top wall portion contiguous to an upper end of the first side wall portion and an upper end of the second side wall portion,
the plurality of insulating housings are aligned in at least one of the first direction and the second direction, and
the plurality of submodules are each disposed in a space defined by the first side wall portion, the second side wall portion, the bottom wall portion, and the top wall portion.

3. The power conversion apparatus according to claim 2, wherein the plurality of insulating housings each further include a back wall portion contiguous to a rear end of the first side wall portion, a rear end of the second side wall portion, a rear end of the bottom wall portion, and a rear end of the top wall portion.

4. The power conversion apparatus according to claim 1, wherein the insulating structure is at least one insulating rack,
the at least one insulating rack each includes a plurality of side wall portions spaced from one another in the first direction and thus aligned, a bottom wall portion contiguous to lower ends of the plurality of side wall portions, and a top wall portion contiguous to upper ends of the plurality of side wall portions, and
the plurality of submodules are each disposed in a space defined by adjacent two of the plurality of side wall portions, the bottom wall portion and the top wall portion.

5. The power conversion apparatus according to claim 4, further comprising a plurality of second frames, wherein
the at least one insulating rack is a plurality of insulating racks aligned in the second direction, and
the plurality of second frames are each disposed between adjacent two of the plurality of insulating racks.

6. The power conversion apparatus according to claim 5, wherein
the first frame and one of the plurality of second frames closest to the first frame are fixed to each other, and
adjacent two of the plurality of second frames are fixed to each other.

7. The power conversion apparatus according to claim 4, wherein the at least one insulating rack is a plurality of insulating racks aligned in the second direction,
the plurality of insulating racks each further include a back wall portion contiguous to rear ends of the plurality of side wall portions, a rear end of the bottom wall portion, and a rear end of the top wall portion,
the plurality of insulating racks include a plurality of first insulating racks and a plurality of second insulating racks aligned in the second direction, and the plurality of first insulating racks have their back wall portions facing those of the plurality of second insulating racks.

8. A power conversion apparatus comprising:

a plurality of submodules; and an insulating structure, the plurality of submodules being aligned in at least one of a first direction and a second direction orthogonal to the first direction, adjacent two of the plurality of submodules being insulated from each other by the insulating structure, wherein the insulating structure is at least one insulating rack, the at least one insulating rack each includes a plurality of side wall portions spaced from one another in the first direction and thus aligned, a bottom wall portion contiguous to lower ends of the plurality of side wall portions, and a top wall portion contiguous to upper ends of the plurality of side wall portions, and the plurality of submodules are each disposed in a space defined by adjacent two of the plurality of side wall portions, the bottom wall portion and the top wall portion, the power conversion apparatus further comprising a reinforcing member made of an insulating material, wherein the reinforcing member connects the insulating structure to a ceiling portion or a wall surface portion of a building in which the power conversion apparatus is stored.

9. A power conversion apparatus comprising:

a plurality of submodules; and an insulating structure, the plurality of submodules being aligned in at least one of a first direction and a second direction orthogonal to the first direction, adjacent two of the plurality of submodules being insulated from each other by the insulating structure, wherein the insulating structure is at least one insulating rack, the at least one insulating rack each includes a plurality of side wall portions spaced from one another in the first direction and thus aligned, a bottom wall portion contiguous to lower ends of the plurality of side wall portions, and a top wall portion contiguous to upper ends of the plurality of side wall portions, and the plurality of submodules are each disposed in a space defined by adjacent two of the plurality of side wall portions, the bottom wall portion and the top wall portion, the power conversion apparatus further comprising a suspension support member formed of an insulating material, wherein the suspension support member connects the insulating structure to a ceiling portion or a wall surface portion of a building in which the power conversion apparatus is stored to suspend the power conversion apparatus from the ceiling portion or the wall surface portion of the building.

* * * * *